United States Patent [19]

Mims

[11] Patent Number: 4,824,311
[45] Date of Patent: Apr. 25, 1989

[54] COMPONENT ASSEMBLY SYSTEM

[76] Inventor: Bruce L. Mims, P.O. Box 153, Greens Farms, Conn. 06436

[21] Appl. No.: 947,174

[22] Filed: Dec. 29, 1986

[51] Int. Cl.$^4$ .............................................. B65G 1/06
[52] U.S. Cl. .................................... 414/273; 414/280; 414/281
[58] Field of Search ................ 414/416, 277, 280–282, 414/659–663, 331, 222, 273, 276; 198/950, 465.1, 346.1

[56] References Cited

U.S. PATENT DOCUMENTS

| | | | |
|---|---|---|---|
| 3,504,808 | 4/1970 | Carabateas | 414/280 X |
| 3,674,159 | 7/1972 | Lemelson | 414/276 |
| 3,782,565 | 1/1974 | Doran et al. | 414/281 X |
| 3,920,195 | 11/1975 | Sills et al. | 414/273 X |
| 3,964,577 | 6/1976 | Bengtsson | 414/280 X |
| 4,312,110 | 1/1982 | Averyanov et al. | 198/346.1 X |
| 4,566,837 | 1/1986 | Shiomi et al. | 198/465.1 X |
| 4,651,863 | 3/1987 | Reuter et al. | 414/280 X |
| 4,668,150 | 5/1987 | Blumberg | 414/280 X |

FOREIGN PATENT DOCUMENTS 186808 10/1984 Japan .................................. 414/331

Primary Examiner—Robert J. Spar
Assistant Examiner—David A. Bucci
Attorney, Agent, or Firm—Edward R. Hyde

[57] ABSTRACT

A system to assemble a large number of component parts that are located in various positions and brought together to an assembly position. The system contemplates an intermediate station located adjacent to the assembly position to which a supply of components are brought prior to being moved to the assembly position.

7 Claims, 4 Drawing Sheets

COMPONENT ASSEMBLY SYSTEM

BACKGROUND OF THE INVENTION

The present invention relates to an assembly system, in which a large number of component parts are located in separate containers or boxes which are individually and selectively brought to a central location where the parts are extracted and assembled.

In the fabrication of printed circuit boards, an operator may sit at a console that mounts one or more circuit boards, and circuit elements located in boxes or bins are conveniently located near the operator. The boxes of components may be arranged on a rack of shelves in columns and rows and individual boxes brought to a fixed position in a programmed manner where the parts are individually taken from their boxes and placed in the appropriate location on the P.C. boards by the operator.

A mechanism will bring a box of components to the assembly location where one or more parts are taken from the box by the operator and mounted on the P.C. board. Then the operator may activate a switch and the mechanism will remove the component box and bring another box into the assembly position. During the time that the prior box is removed and returned to its original location or home position and the subsequent box taken from its normal position to the assembly position a considerable amount of time may elapse which constitutes wasted assembly time.

The present invention is designed to minimize or eliminate the delay between the time a box of parts is withdrawn form the assembly position and the next box brought to the position.

Accordingly, it is an object of the present invention to provide a system for efficiently and quickly moving boxes of components to be assembled to and from a fixed assembly position.

Another object of the present invention is to provide a printed circuit board assembly system in which the circuit elements are located in individual boxes which are efficiently and quickly brought to an assembly position for mounting on the circuit board.

Another object of the present invention is to provide a system for assembling printed circuit boards in which the circuit elements are located in containers or boxes arranged in a rack of rows and columns and in which the individualy selected parts boxes are brought to an assembly position with minimum delay.

A more specific object of the present invention is to provide a printed circuit board assembly system in which a rack of circuit board parts boxes are brought to an assembly location with minimum delay and in which there is a ready position for thee parts boxes located in close proximity to the assembly position.

These and other objects of the invention will become apparent from the following description considered with the drawings.

DESCRIPTION OF A SPECIFIC EMBODIMENT

Figure 1:
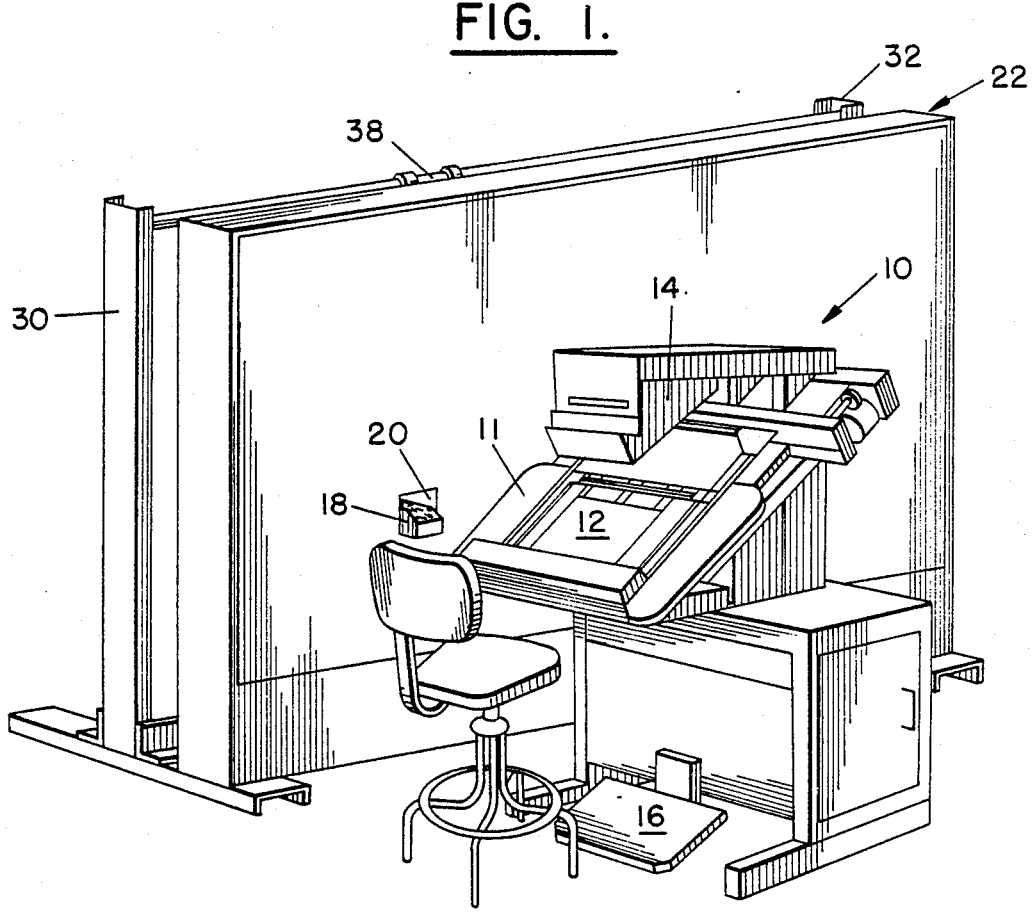
FIG. 1 is a perspective view of a printed circuit board assembly system showing the operator console.

Referring to FIG. 1 there is shown an assembly console 10 at which an operator may sit in performing the assembly operation of placing circuit elements on a printed circuit board. The console includes a table 11 upon which is mounted a printed circuit board 12 that receives the circuit elements. The board is secured by mounting means on the table which is moveable in two directions and is conventionally known as an X-Y table. The movement of the table is programmed so that a position on the circuit board which in turn receives an element is brought to a mounting location. In this manner there is one single location on the table used by the operator to mount the circuit element.

A projector 14 is mounted above the X-Y table 11 and may project two light spots onto the circuit board to indicate to the operator the location for mounting the individual circuit elements. As each element is mounted on the circuit board a mechanism (not shown) may clip and bend the leads projecting on the underside of the board.

In operation the operator sitting at the console will activate a switch as by a foot pedal 16 which, through the mechanism hereinafter described will bring a parts box 18 to an assembly position 20. At this time the X-Y table will have moved the circuit board 12 to the appropriate location for mounting the parts in box 18 on the board. The operator will then remove circuit components from the box 18, mount them on the circuit board and press foot pedal switch 16. The actuation of the foot switch will cause the parts box 18 to be retracted and removed from the assembly location 20 and the next appropriate parts box brought to the assembly location. During this movement the X-Y table will relocate the circuit board to bring the next appropriate location on the board to the illuminated mounting position for the operator to mount the next circuit element.

It is seen that there would normally be a delay after the foot switch 16 is accuated during which the parts box 18 is removed from the assembly position and the next appropriate parts box is brought to the assembly position.

Figure 3:
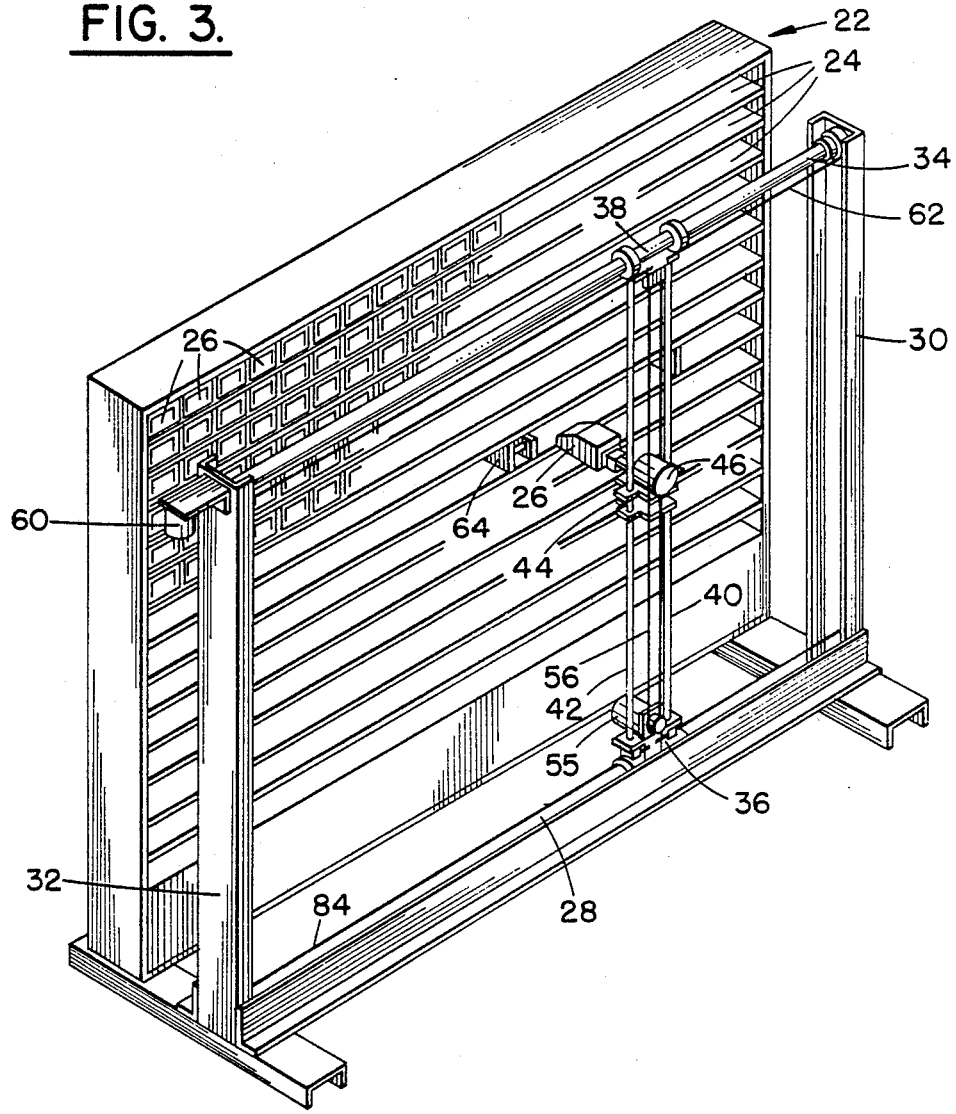
FIG. 3 is a perspective view of the rear of a rack of parts boxes and showing the transport mechanism for moving individual boxes from their normal locations to the assembly location.

The transport mechanism for moving the component boxes is more clearly shown in FIG. 3 which illustrates the rear of rack 22 containing shelves 24 which support rows of boxes 26. It is understood that each of the parts boxes contains a supply of similar circuit elements and each box must be brought to the assembly location 20 in a predetermined manner in accordance with the X-Y table movement of the circuit board.

In the embodiment shown in FIG's 3 and 5, the individual boxes are brought to the ready position 61 by means of an X-Y picker. The latter comprises a framework consisting of a lower horizontal bar 28, two upstanding support members 30, 32 and an upper horizontal bar 34.

Figure 6:
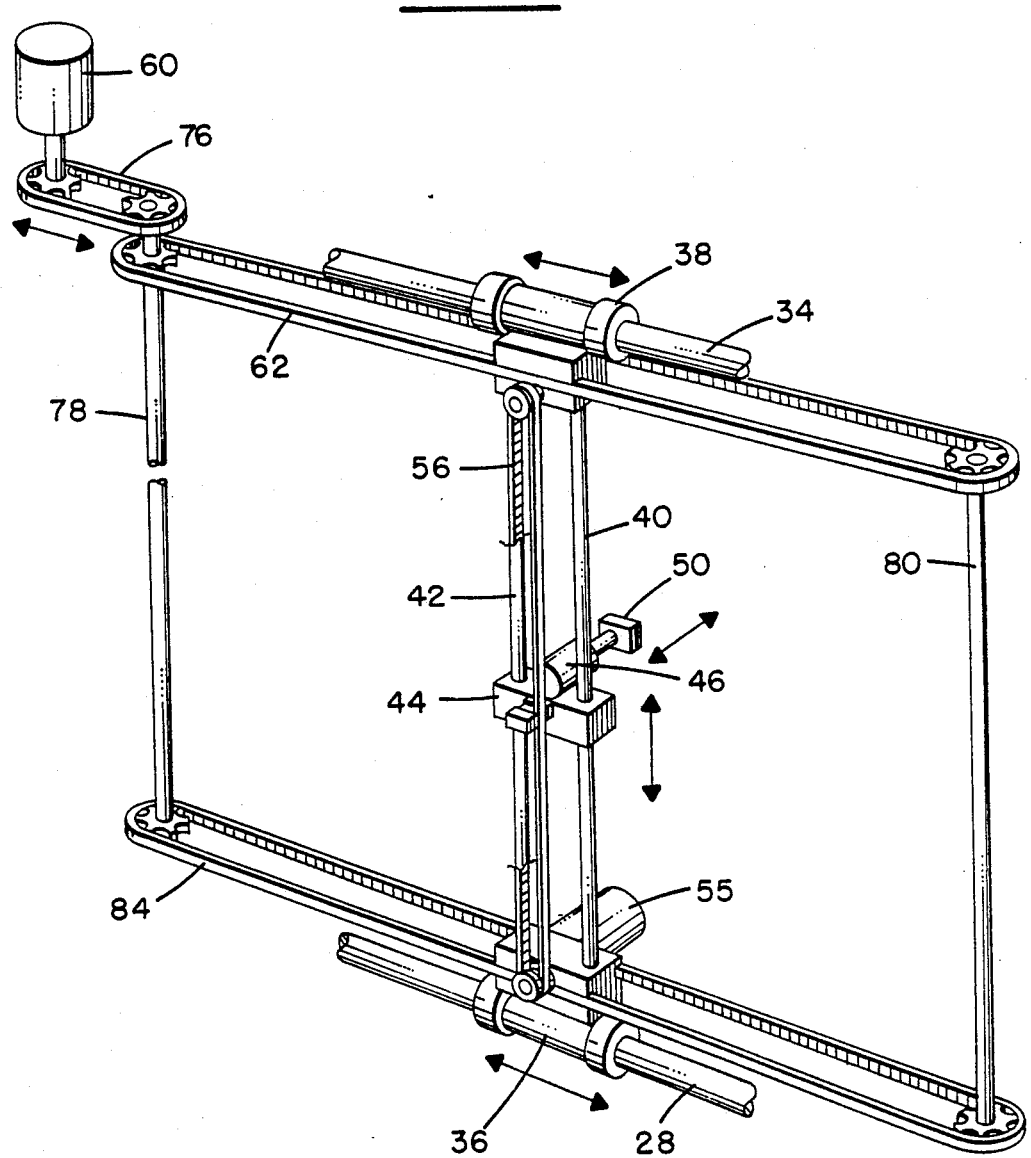
FIG. 6 is a view of the picker transport mechanism.

As seen in FIG. 6 the lower slide assembly 36 rides horizontally or in an X direction on lower bar 28 and upper slide assembly 38 rides along upper bar 34.

Slide assemblies 36, 38 are joined by carriage support rods, 40, 42 which serve to support picker carriage 44.

Figure 5:
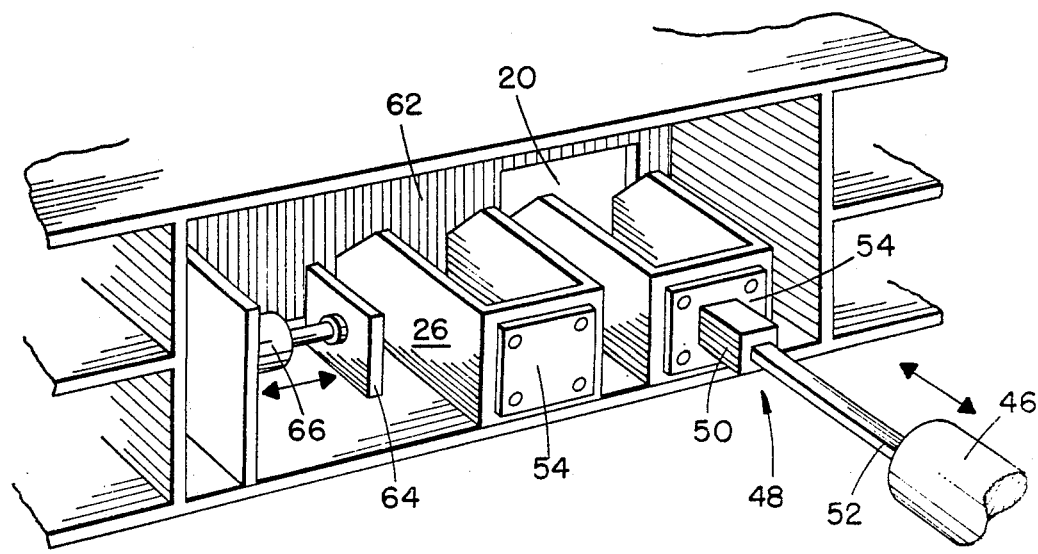
FIG. 5 is a perspective view showing one component box located in the assembly position and another box in the ready position.

A solenoid activated air cylinder 46 is mounted on carriage 44 to control a parts box picker mechanism 48 more clearly seen in FIG. 5. The picker includes an electromagnetic head 50 secured to a ball slide 52 that reciprocates under control of pneumatic cylinder 46, and insures against rotation of the picker. The back of each of the parts boxes 26 has secured thereto a magnetically attracted material plate 54 by which the parts box may be moved under the control of the picker magnet 50. Thus to transport a parts box the picker 48 under the control of the pneumatic cylinder 46 reciprocates forward so the electromagnet 50 engages the metal plate 54 at which time the magnet is energized. The picker is then reciprocated rearwardly as shown in FIG. 5 to move the box from its home position on the shelf.

Slide assembly 36 includes an electric motor 55 that may be called the Y motor and which drives a belt 56 which passes over a sprocket on slid 38 and is secured to picker carriage 44. Thus the selective rotation of motor 55 will cause the picker carriage to rise or lower to a desired vertical location to engage or disengage a particular parts box.

As shown in FIG. 6 a stepping motor 60 is secured to the upper end of support (FIG. 3) and drives a belt 76 which in turn drives verticle shaft 78. The upper and lower ends of shaft 78 carry sprockets which drive belts 62 and 84 respectively. These belts pass over idlers secured to the ends of shaft 80. Thus rotation of stepping motor 60 will cause slide 38 to move in a horizontal direction and correspondingly move picker carriage 44 to a selected horizontal location to engage a parts box. It is seen then that when it is desired to move a parts box the motors 55 and 60 are energized to move the picker carriage to a position in which the picker mechanism 48 is aligned with the desired box. The pneumatic cylinder 46 will then reciprocate the picker arm 52 to bring the electromagnet in contact with the plate secured to the rear of the parts box at which time the magnet is energized. The picker arm is then reciprocated rearwardly to withdraw the box from its location and the motors are again energized to move the picker carriage to another location to deposit the box. The transport mechanism is controlled by a suitable programmed processor so that the individual parts boxes are sequentially brought from their home positions on the rack 22 for assembly of the components on the circuit board.

A particularly novel feature of the present invention is the provision of a ready station 61 located on the rack adjacent to the assembly station 20. In the normal operation of the transport mechanism the individual parts boxes 26 must be withdrawn from their home positions on the rack by the picker mechanism and individually brought to the ready station 62. A box push mechanism 64 operated by a solenoid controlled pneumatic cylinder 66 serves to push a box located in the ready position 61 laterally into the assembly position 20 at the appropriate time in the transport cycle as will be hereinafter described.

Figure 4:
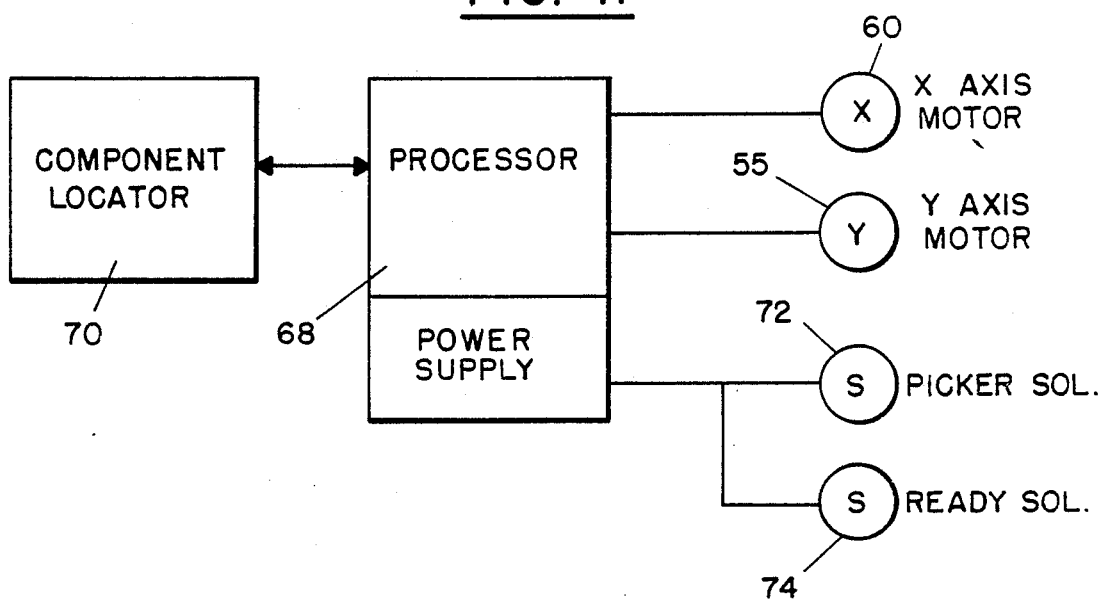
FIG. 4 is a block diagram of operating elements of the transport mechanism.
Figure 2:
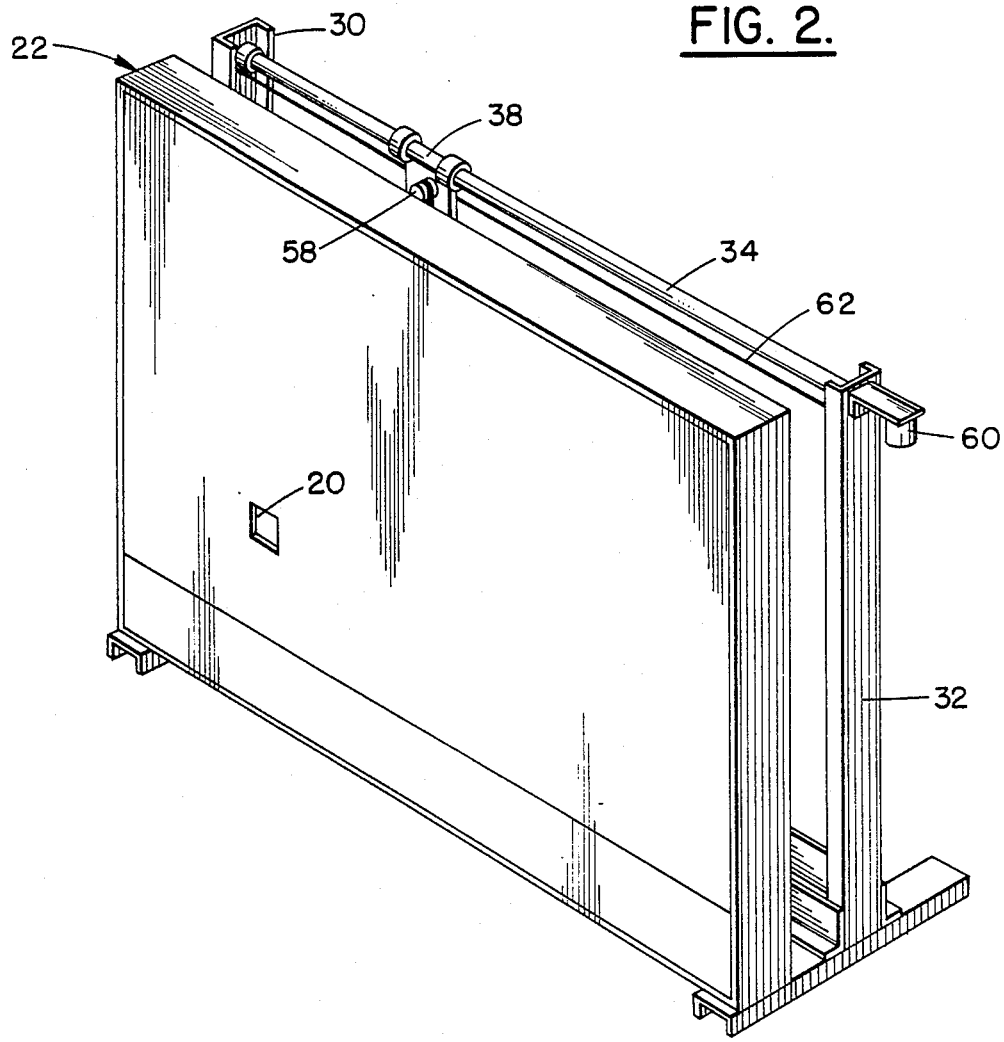
FIG. 2 is perspective view of the front of a rack of circuit board parts boxes.

Referring now to FIG. 4 it is seen that a central processor 68 controls the component locator 70 including the X-Y table which in turn operates the X-Y table 11 to locate the circuit board 12 in position to receive the appropriate component. The program and processor 68 similarly controls the X axis motor 60 and Y axis motor 55 of the picker mechanism.

Pneumatic cylinder 46 controlling the reciprocating movement of the picker is actuated by picker solenoid 72 and the cylinder 66 controlling the lateral movement from the ready position to the assembly position is actuated by solenoid 74. Thus it is seen that picker 48, lateral ready movement mechanizm 64, X-Y table 11 and electromagnet 50 are all synchronized under control of the programmed processor 68.

A cycle of operation would proceed in the following manner. With boxes located in both the ready and assembly positions the operator will mount the circuit elements from the assembly box on the circuit board. When this manual operation is completed the operator will actuate the foot pedal switch to initiate a cycle of operation.

1. The picker solenoid 72 causes cylinder 46 to promptly withdraw the box that is in the assembly position.

2. Solenoid 74 immediately actuates, causing cylinder 66 to push the box from the ready position to the assembly position. This is done without waste of time and the operator can promptly proceed to extract parts from the new box now in the assembly position.

3. The X-Y motors 60 and 55 move the picker carriage, carrying the prior box to its home position on the rack.

4. The box is deposited in its home position by the advance of the picker mechanism and the demagnitization of magnet 50.

5. Under control of the processor the picker advances to the next box in the programmed sequence which is brought to the ready position.

6. The picker mechanism is then moved to the assembly position and stands ready to remove the next box now in that position when the operator again actuates the manual switch.

A particularly important feature of the invention is that while the operator is withdrawing a component from the box in the assembly position the picker is returning the prior box to its home position and withdrawing the next box and depositing it in the ready position. Then when the operator has mounted the component and presses the foot pedal switch the box pusher cylinder 66 promptly slides the component box from the ready position to the assembly position.

Although the invention has been described with respect to a specific embodiment it is understood that various modifications and embodiments may be made within the spirit and scope of the appended claims.

I claim:

1. A system for transporting components to a predetermined location for assembly comprising:
   a plurality of component containers each adapted to contain a supply of similar components;
   rack means providing home positions for said containers in a plurality of substantially horizontal planes;
   each said container being located in a predetermined home position on said rack means;
   means providing an assembly position on one of said substantially horizontal planes of said rack means at which components may be withdrawn from the said containers;
   means on the rack means for providing a ready position in the same substantially horizontal plane as the assembly position and adjacent to the assembly position for the containers;
   transport means to individually transport the containers from their respective home positions to the ready position and from the assembly position back to the respective home positions;

moving means to move a container located in the ready position to the assembly position;

control means for the transport means and the moving means; and whereby the control means activates the moving means to move a container from the ready position to the assembly position promptly upon the transport means moving a container from the assembly position, said transport means and moving means being separately and concurrently operable.

2. A system as set forth in claim 1 in which the transport means is inactive during a period when a container is in the assembly position, and means controlled by an operator to activate said transport means.

3. A system as set forth in claim 2 in which the means controlled by the operator includes means to activate the moving means to move a container from the ready position to the assembly position.

4. A system for transporting printed circuit components to a predetermined location for assembly on a printed circuit board comprising:

rack means having a plurality of shelves forming a plurality of substantially horizontal planes;

a plurality of component containers located on said shelves;

means providing a component assembly position on said rack means in one of said substantially horizontal planes;

means providing a ready position located on the rack means adjacent said means providing the component assembly position and in the same substantially horizontal plane as the component assembly position;

rectilinear transport means positioned adjacent the rack means including;

carriage means;

container picker means located on the carriage means;

means to move the carriage means in a predetermined sequence whereby the picker means moves containers in a predetermined sequence from the positions on the rack shelves to the container ready position;

means to move the carriage means whereby the picker means moves the containers from the assembly position to their predetermined positions on the rack shelves;

moving means operable to move a container in the ready position to the assembly position;

control means to separately and independently operate the transport means and moving means; and said control means including means to activate the transport means to move a container from the assembly position to the home position and to activate the moving means during the period the transport means is moving a container form the assembly position to the home position.

5. A system as set forth in claim 4 including manually operable means to initiate the transport means to transport a container from the assembly position to its home position on the rack means.

6. A system as set forth in claim 5 in which the container picker means includes electromagnetic means and reciprocating means secured to the electromagnet means to engage and transport the said containers.

7. A system as set forth in claim 6 including a first solenoid controlled air cylinder means to reciprocate the picker means and second solenoid controlled air cylinder means to activate the moving means.

* * * * *